(12) United States Patent
Hofer et al.

(10) Patent No.: US 11,468,147 B1
(45) Date of Patent: Oct. 11, 2022

(54) ACTIVATION FUNCTION APPROXIMATION IN DEEP NEURAL NETWORKS USING RECTIFIED-LINEAR-UNIT FUNCTION

(71) Applicant: Habana Labs Ltd., Caesarea (IL)

(72) Inventors: Elad Hofer, Haifa (IL); Sergei Gofman, Haifa (IL); Shlomo Raikin, Yassur (IL)

(73) Assignee: HABANA LABS LTD., Caesarea (IL)

( * ) Notice: Subject to any disclaimer, the term of this patent is extended or adjusted under 35 U.S.C. 154(b) by 458 days.

(21) Appl. No.: 16/798,469

(22) Filed: Feb. 24, 2020

Related U.S. Application Data

(60) Provisional application No. 62/876,801, filed on Jul. 22, 2019.

(51) Int. Cl.
*G06F 17/17* (2006.01)
*G06N 3/08* (2006.01)
*G06N 3/04* (2006.01)

(52) U.S. Cl.
CPC .............. *G06F 17/17* (2013.01); *G06N 3/04* (2013.01); *G06N 3/084* (2013.01)

(58) Field of Classification Search
CPC ........... G06F 17/17; G06N 3/04; G06N 3/084
See application file for complete search history.

(56) References Cited

U.S. PATENT DOCUMENTS

| | | | | |
|---|---|---|---|---|
| 2018/0053086 | A1* | 2/2018 | Liu | G06N 3/063 |
| 2018/0060278 | A1* | 3/2018 | Lin | G06F 7/544 |
| 2018/0089562 | A1* | 3/2018 | Jin | G06F 17/18 |
| 2018/0144245 | A1* | 5/2018 | Simard | G06N 3/084 |
| 2018/0373977 | A1 | 12/2018 | Carbon et al. | |
| 2019/0042922 | A1 | 2/2019 | Pillai et al. | |
| 2019/0266479 | A1 | 8/2019 | Singh et al. | |
| 2019/0385041 | A1* | 12/2019 | Gebhardt | G06N 3/0481 |
| 2020/0168271 | A1* | 5/2020 | Vasyltsov | G11C 11/416 |

(Continued)

FOREIGN PATENT DOCUMENTS

CN    112200299 A  *  1/2021  ........... G06N 3/0454

OTHER PUBLICATIONS

M. Wang, B. Liu and H. Foroosh, "Look-Up Table Unit Activation Function for Deep Convolutional Neural Networks," 2018 IEEE Winter Conference on Applications of Computer Vision (WACV), 2018, pp. 1225-1233, doi: 10.1109/WACV.2018.00139. (Year: 2018).*

(Continued)

*Primary Examiner* — Charles T Shedrick
(74) *Attorney, Agent, or Firm* — Kliger & Associates Patent Attorneys Ltd

(57) ABSTRACT

A computational apparatus for implementing a neural network model having multiple neurons that evaluate an activation function, the apparatus including a memory and circuitry. The memory is configured to hold values of a difference-function, each value being a respective difference between the activation function and a predefined baseline function. The circuitry is configured to evaluate the neural network model, including, for at least one of the neurons: evaluate the baseline function at the argument, retrieve from the memory one or more values of the difference-function responsively to the argument, and evaluate the activation function at the argument based on the baseline function at the argument and on the one or more values of the difference-function.

16 Claims, 5 Drawing Sheets

(56) References Cited

U.S. PATENT DOCUMENTS

2020/0401873 A1* 12/2020 Lin .......................... G06N 3/04
2021/0142171 A1*  5/2021 Jung .................... G06N 3/0481
2021/0397596 A1* 12/2021 Antony ............... G06F 16/2282
2022/0207331 A1*  6/2022 Andoche .............. G06V 10/774

OTHER PUBLICATIONS

F. Piazza, A. Uncini and M. Zenobi, "Neural networks with digital LUT activation functions," Proceedings of 1993 International Conference on Neural Networks (IJCNN-93-Nagoya, Japan), 1993, pp. 1401-1404 vol. 2, doi: 10.1109/IJCNN.1993.716806. (Year: 1993).*
Nair et al., "Rectified linear units improve restricted Boltzmann machines", Proceedings of the 27th international conference on machine learning (ICML-10), pp. 1-8, Haifa, Israel, year 2010.
Hendrycks et al., "Gaussian error linear units (GELUs)", arXiv preprint arXiv: 1606.08415, pp. 1-9, Nov. 11, 2018.
Ramachandran et al., "Searching for activation functions", arXiv preprint arXiv:1710.05941, pp. 1-13, Oct. 27, 2017.

* cited by examiner

ACTIVATION FUNCTION APPROXIMATION IN DEEP NEURAL NETWORKS USING RECTIFIED-LINEAR-UNIT FUNCTION

CROSS-REFERENCE TO RELATED APPLICATIONS

This application claims the benefit of U.S. Provisional Patent Application 62/876,801, filed Jul. 22, 2019, whose disclosure is incorporated herein by reference.

FIELD OF THE INVENTION

The present invention relates generally to processing methods for deep learning, and particularly to approximation schemes optimized for implementation in a computation hardware for deep learning.

BACKGROUND OF THE INVENTION

Approximation methods optimized for implementation in computation circuitry suited for running deep neural network calculations were previously proposed in the patent literature. For example, U.S. Patent Application Publication 2018/0373977 describes a neuron circuit capable of producing a weighted sum of digitized input signals and applying an activation function to the weighted sum so as to produce a digitized activation signal as output. The circuit includes at least: one multiplier multiplying each input signal with a respective weight value, one accumulator accumulating the results of the multiplier so as to produce the weighted sum, and one activation unit executing the activation function. The activation unit comprises at least one shift unit and at least one saturation unit capable of approximating a non-linear activation function. The result of the approximated activation function is obtained by one or more arithmetic shifts applied to the weighted sum.

As another example, U.S. Patent Application Publication 2019/0042922 describes an apparatus comprising, in an embodiment, log and antilog circuits comprising circuitry to perform a logarithm or an antilogarithm operation using piecewise linear approximation. In another embodiment, the apparatus further comprises an activation function circuit, wherein the activation function circuit comprises the log and antilog circuits. In yet another embodiment, the activation function comprises one or more exponent operations, with the activation function circuit further comprising an exponent circuit to perform the one or more exponent operations using piecewise linear approximation.

U.S. Patent Application Publication 2019/0266479 describes an integrated circuit with a reconfigurable stream switch formed in the integrated circuit along with a plurality of convolution accelerators and an arithmetic unit coupled to the reconfigurable stream switch. The arithmetic unit has a plurality of data paths. In an embodiment, at least one of the plurality of data paths is solely dedicated to performance of operations that accelerate an activation function represented in the form of a piece-wise second order polynomial approximation.

SUMMARY OF THE INVENTION

An embodiment of the present invention provides a computational apparatus for implementing a neural network model having multiple neurons that evaluate an activation function, the apparatus including a memory and circuitry. The memory is configured to hold values of a difference-function, each value being a respective difference between the activation function and a predefined baseline function. The circuitry is configured to evaluate the neural network model, including, for at least one of the neurons: evaluate the baseline function at the argument, retrieve from the memory one or more values of the difference-function responsively to the argument, and evaluate the activation function at the argument based on the baseline function at the argument and on the one or more values of the difference-function.

In some embodiments, the baseline function includes a Rectified Linear Unit (ReLU) function defined as ReLU$(x)=\max(0,x)$. In some embodiments, the baseline function includes a generalized ReLU (GReLU) function defined as GReLU$(x)=\max(0,ax)$, where $a>0$. In other embodiments, the baseline function includes a Leaky GReLU (LeakyGReLU) function defined as LeakyGReLU$(x)=\max(bx, ax)$, where $0<b<a$.

In an embodiment, the activation function includes at least one function, selected from a group of functions consisting of a Gaussian Error Linear Unit (GELU) function, a SWISH function, a Linearly Scaled Hyperbolic Tangent (LISHT) function, and a Symmetrical Gelu (SGELU) function.

In another embodiment, the difference-function has one of an even symmetry and an odd symmetry.

In some embodiments, the circuitry is configured to: retrieve two or more values of the difference-function from the memory, evaluate the difference-function at the argument by interpolating the two or more values, and evaluate the activation function at the argument by summing the baseline function at the argument and the difference-function at the argument.

In some embodiments, the circuitry is further configured to output the evaluated activation function at the argument for use in the neural network model.

There is additionally provided, in accordance with another embodiment of the present invention, a computational method for implementing a neural network model having multiple neurons that evaluate an activation function, the method includes holding in a memory values of a difference-function, each value being a respective difference between the activation function and a predefined baseline function. The neural network model is evaluated, including, for at least one of the neurons: evaluating the baseline function at the argument, retrieving from the memory one or more values of the difference-function responsively to the argument, and evaluating the activation function at the argument based on the baseline function at the argument and on the one or more values of the difference-function.

The present invention will be more fully understood from the following detailed description of the embodiments thereof, taken together with the drawings in which:

DETAILED DESCRIPTION OF EMBODIMENTS

Overview

Figure 1:
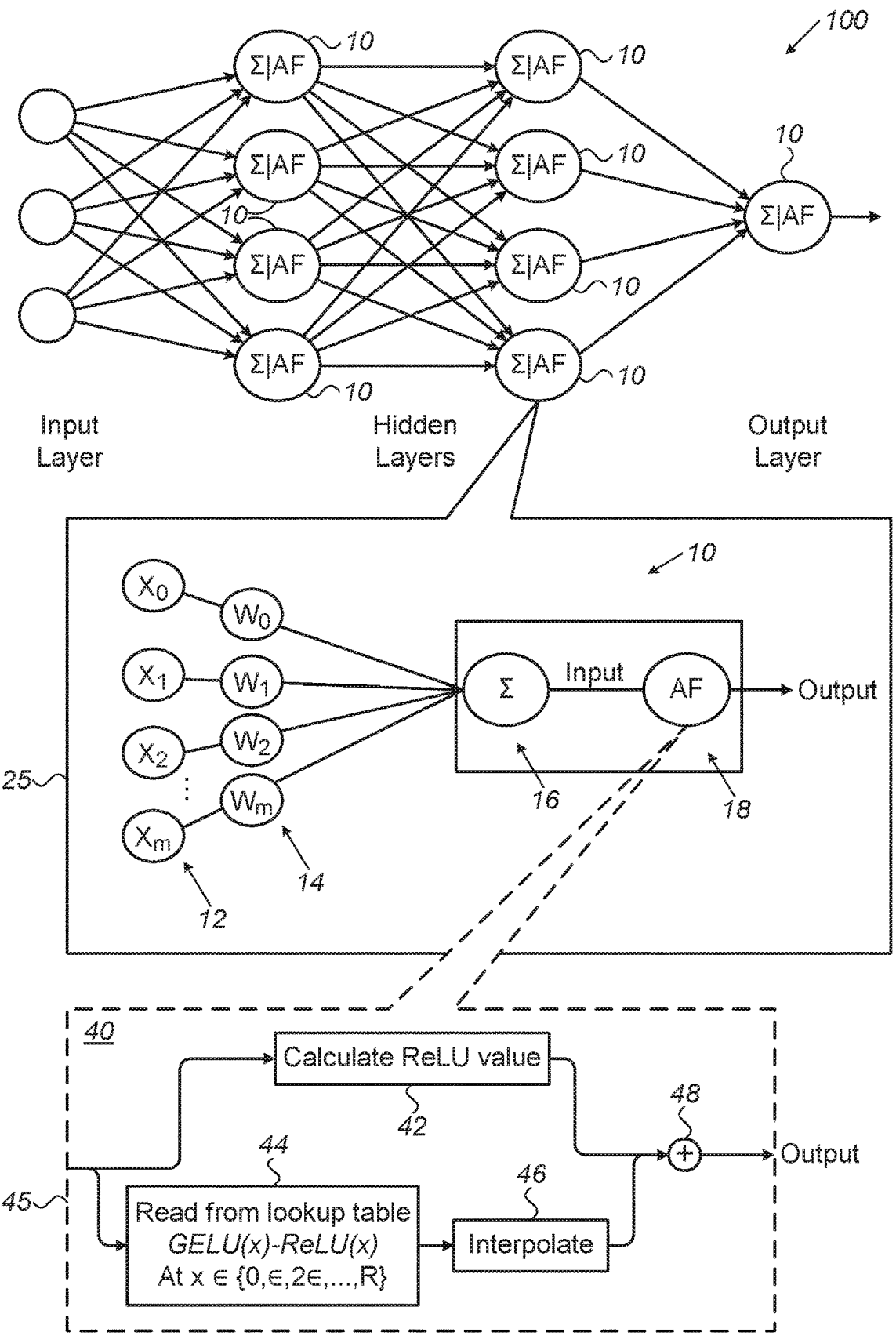
FIG. 1 is a schematic, pictorial block diagram of an artificial neural network (ANN) comprising neural circuits each applying an approximation of an activation function (AF), in accordance with an embodiment of the present invention.

Artificial Neural Networks (ANN) comprise a large number of simple neuron circuits, each of which performs an elementary non-linear transformation of multiple inputs it receives by applying an activation function to a weighted sum of the inputs. Acting collectively, the neuron circuits can calculate, by together analyzing highly complex non-linear transformations, accurate solutions to many complex problems, such as natural language processing and computer vision.

A neural network is considered a deep neural network if it has one or more "hidden layers" of neuron circuits, each of which processes multiple inputs, and an output layer that provides the final output of the model. In a deep neural network, output values of the neuron circuits propagate in a forward direction through the network from input to output layers, including through any number of the hidden layers between them. The neuron circuit activation functions are a crucial component in affecting the output of the deep neural network, its accuracy, and also the computational efficiency (e.g., speed of convergence) of a training phase of a deep learning model, all of which determine the model's suitability to practical, often commercial, applications.

Specifically, forward propagation is the process of multiplying the various input values of a particular neuron circuit by their associated weights, summing the results, and non-linearly scaling the output values, using the activation function, to fall in a predetermined range before passing these signals on to the next layer of neuron circuits. Activation functions enable the deep learning model to create complex mappings between the network's inputs and outputs, which are essential for learning and modeling complex data, such as images, video, audio, and data sets for which accurate learning requires using non-linear transformations.

An additional aspect of activation functions is their computational efficiency, since they are typically calculated across thousands or more neuron circuits for each data sample. Modern neural network models use a technique called backpropagation to train the model, which places an increased computational strain both on the activation function and its derivative function.

The need for speed has led to the development of new activation functions, such as the Rectified Linear Unit (ReLU), SWISH and Gaussian Error Linear Unit (GELU), which are described below. Moreover, there is an ongoing effort to identify ever-newer activation functions which may surpass existing functions in several aspects, such as speed of convergence and accuracy of results of a neural network model. However, it was found that almost all of these functions, except for the ReLU function, tend to be hard to implement in computation hardware.

Embodiments of the present invention that are described hereinafter provide approximation and generation schemes of activation functions using a predefined baseline function, such as the ReLU function, as well as a computational apparatus to easily implement these approximation and generation schemes in computation hardware to: (a) approximate activation functions common to deep learning (e.g., the GELU and SWISH functions), and (b) generate and approximate new activation functions that may have further advantages for deep learning.

To easily approximate and/or generate the activation functions in computation hardware, the disclosed embodiments take advantage of an observation that while such functions (e.g., GELU, SWISH and others) are hard to approximate or generate on computation hardware, the difference-functions between them and the predefined baseline function (e.g., the ReLU function) are (i) bounded and (ii) have either even or odd symmetry, making the difference-functions easy to approximate or generate in an approximated form on computation hardware. These difference-functions can be stored as lookup tables, and any required intermediate value is much easier to approximate (e.g., using linear interpolation) by a computational apparatus.

While GELU and SWISH are currently leading examples of such common functions that are beneficial for approximation approximate in computation hardware for deep learning, many other functions can be considered, which can be applied in computation hardware using the disclosed approximation scheme. To cover numerous activation functions that can take advantage of the disclosed scheme, in one embodiment, the ReLU function is generalized to have any prespecified slope at positive input values. Additionally or alternatively, the ReLU function is further generalized to have a parametrized leaky term for negative input values, as described below.

In some embodiments, a computational apparatus for implementing a neural network model having multiple neurons that evaluate an activation function is provided, the apparatus comprises: (a) a memory, configured to hold values of a difference-function, each value being a respective difference between the activation function and a predefined baseline function, and (b) circuitry, configured to evaluate the neural network model, including, for at least one of the neurons: (i) evaluate the baseline function at the argument, (ii) retrieve from the memory one or more values of the difference-function responsively to the argument, and (iii) evaluate the activation function at the argument based on the baseline function at the argument and on the one or more values of the difference-function.

As noted above, in some embodiments, the disclosed approximation scheme and computational apparatus enable the generation of numerous different types of new activation functions that are easy to subsequently approximate on computation hardware. For example, the disclosed technique enables the generation and subsequent approximate functions which are asymmetric variants of the recently evaluated even activation functions, the Symmetrical Gaussian Error Linear Unit (SGELU) and the Linearly Scaled Hyperbolic Tangent (LiSHT). In particular, the new asymmetric functions may be generated and subsequently approximated using the above even functions (e.g., the SGELU and LiSHT) as the bounded and even difference-functions put in a lookup table.

In general, given a lookup table of values that represents any both bounded and even or odd function that might be approximated using the disclosed scheme, values of a new activation function can be generated from that lookup table by adding values interpolated over the lookup table values to a respective predefined baseline function (e.g., to a ReLU, or a generalized ReLU function, as described below) value. Any such new function would therefore be as easy to approximate as the GELU and SWISH functions.

Provided with the disclosed approximation and generation schemes (e.g., algorithms), a computational apparatus can be readily configured (e.g., programmed) in software containing the algorithms to enable the circuitries of the apparatus to conduct each of the disclosed circuitry-architecture-related steps and functions outlined above with high efficiency.

By providing efficient approximation and generation schemes for complex activation functions, such as SWISH and GELU (and numerous others that are described above and further below), artificial intelligence products using the disclosed methods and computational apparatuses could achieve wider commercial use. The disclosed embodiments refer mainly to the ReLU function and its variants as the baseline function. Alternatively, however, any other suitable baseline function can be used.

System Level Description of an Approximation Scheme of an Activation Function FIG. 1 is a schematic, pictorial block diagram of an artificial neural network (ANN) 100 comprising neural circuits 10, each applying an activation function (AF) 18 comprising a computation 40 diagram describing approximating the AF values, in accordance with an embodiment of the present invention.

ANN 100 is a simplified deep neural network brought purely for clarity and simplicity of presentation. In ANN 100, each neuron circuit 10 is connected to numerous other neurons, allowing signals to pass, e.g., during inference or during training, in a forward direction through the network from input to output layers through the hidden intermediate layers.

As noted above, forward propagation is the process of multiplying the various input values of a particular neuron by their associated weights, summing the results, and non-linearly scaling the output values using an activation function to fall in a predetermined range (e.g., [−0.4,4]). The signals are then passed on to the next layer of neurons. As further seen, activation functions typically reside within all neuron circuits except in an input layer of neurons where this is not required.

AFs 18 of neuron circuits 10 ensure that the output values forwarded to subsequent layers are kept within an acceptable and useful range. In order to be useful, activation functions should also be nonlinear and continuously differentiable. Nonlinearity allows the neural network to be a universal approximation; a continuously differentiable function is useful mainly for gradient-based optimization methods, which allow the efficient back propagation of errors throughout the network.

Forward propagation performed by an example neuron circuit 10 is illustrated in inset 25, where the input to an AF 18 is a sum 16 of products of inputs $\{X_k\}$ 12 and their corresponding weights $\{W_k\}$ 14.

An output of a layer of neural circuits 10 is fed as an input to the next layer. This, in turn, affects the weighted input value sums of the following layers of ANN 100, and so on, which then affects the computation of new weights and their distribution backward through the network. Ultimately, the above-described process affects the final output value(s) of ANN 100.

AF 18 should be provided and applied with a very high degree of accuracy in order to avoid erroneous outputs from numerous neuron circuits propagating over successive layers. Otherwise, considering the ubiquitous use of AF 18 in ANN 100, this will cause ANN 100 to produce erroneous results.

In some embodiments, the disclosed approximation or generation schemes of AF 18 values is described by a computation 40, shown by a schematic block diagram 45 (by way of example for the GELU AF, but may be applied to approximate multiple different AFs, according to those required in ANN 100).

Figure 4:
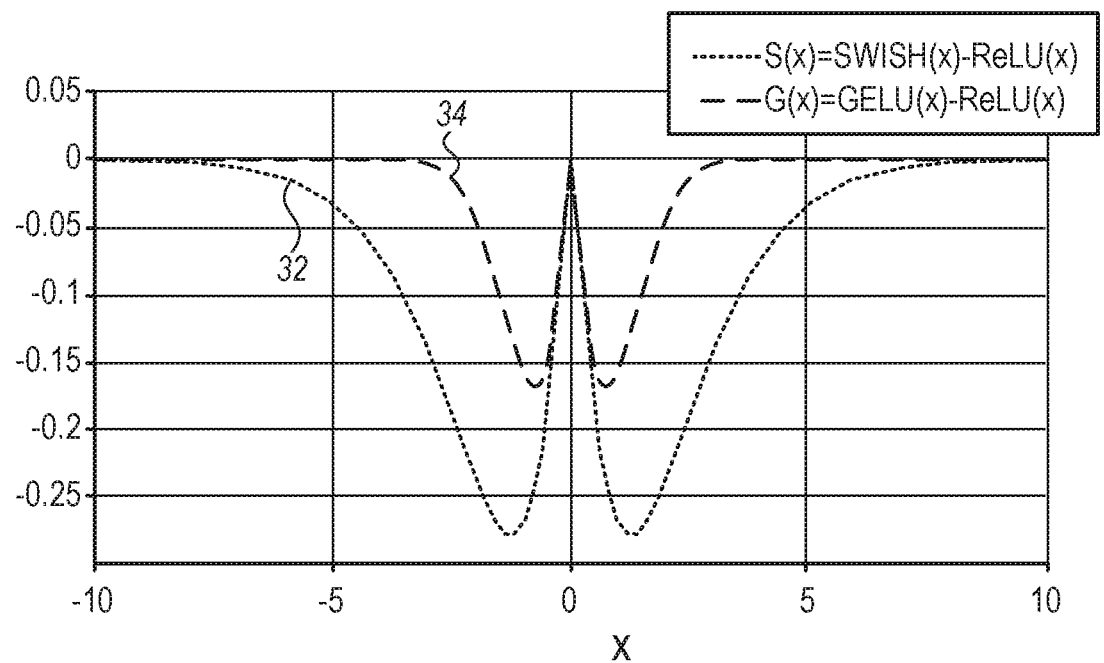
FIG. 4 is a graph that shows the difference-functions S(x)=SWISH(x)−ReLU(x) and G(x)=GELU(x)−ReLU(x), in accordance with an embodiment of the present invention.

Computation 40 comprises reading one or more difference-function values from a memory (memory shown in FIG. 2) that holds one or more precomputed lookup tables of difference-functions (e.g., of difference-functions S(x)=SWISH(x)−ReLU(x) and G(x)=GELU(x)−ReLU(x) plotted in FIG. 4).

The shown lookup table that is read (44) from memory covers an input range of arguments x, x∈[0, R], with a resolution ε. For example, R=4 can be for GELU, and R=8 for SWISH and ε=0.001 that yield a table with 4,000 or 8,000 values. Due to the difference-functions S(x) and G(x) being even or odd (i.e., having even or odd symmetry—see FIG. 4), values for negative inputs x are readily available from the same table.

Figure 3:
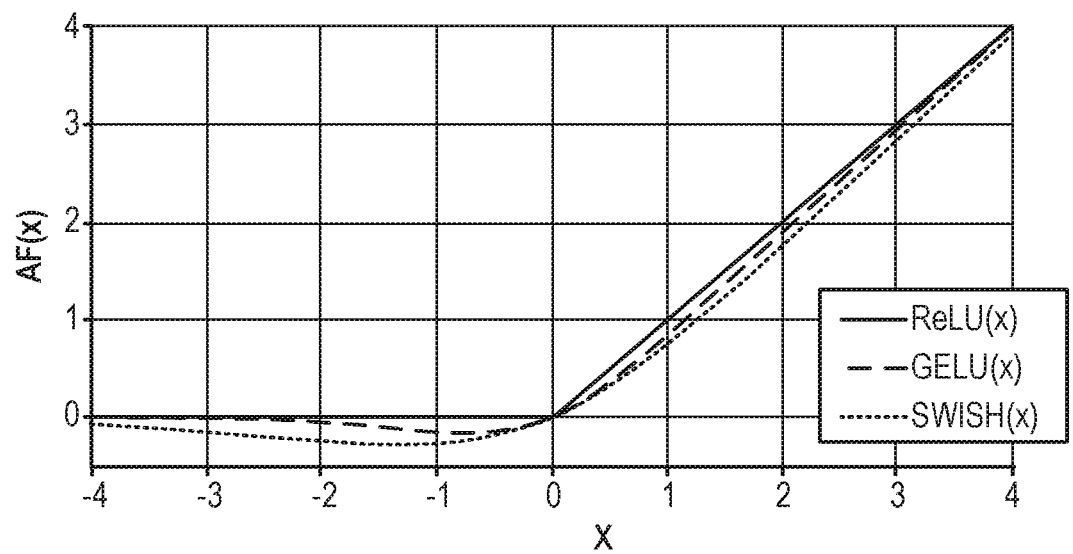
FIG. 3 is a graph that shows the activation functions ReLU(x), GELU(x), and SWISH(x) over a given range, in accordance with an embodiment of the present invention.
Figure 5A:
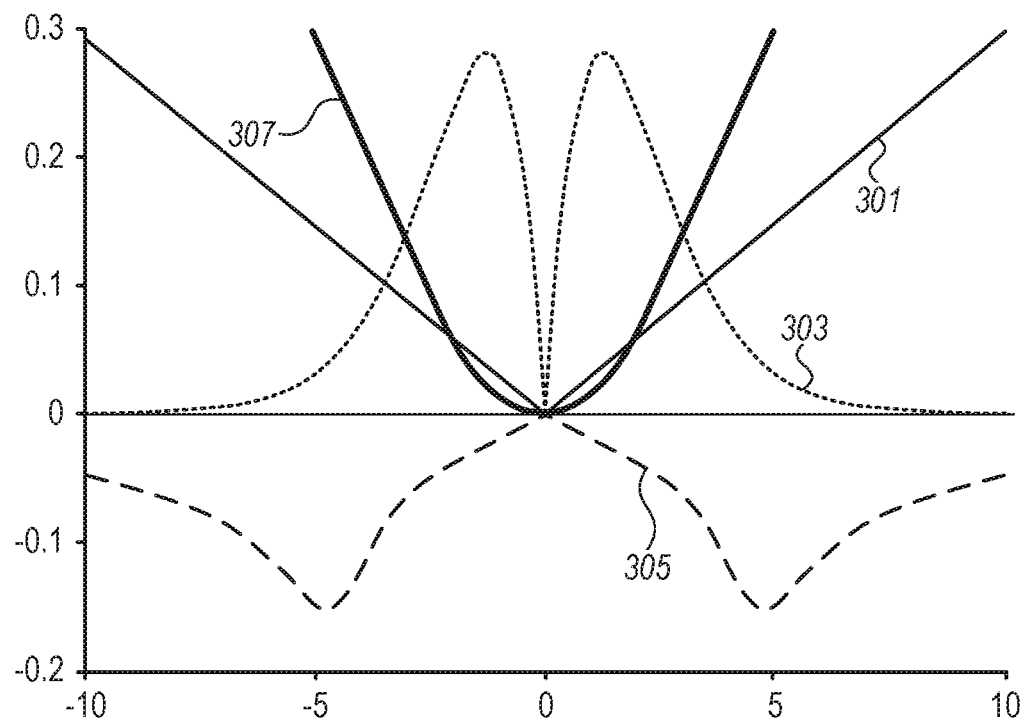
FIGS. 5A and 5B are graphs that show bounded and even difference-functions that can be provided as lookup tables, and respective activation functions generated by adding the difference-functions to the ReLU function, in accordance with an embodiment of the present invention.
Figure 5B:
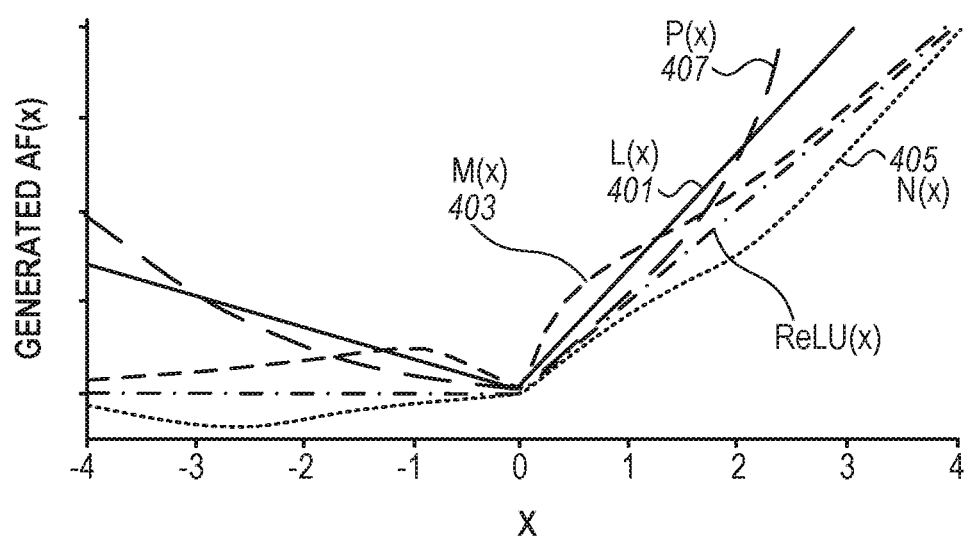

A difference computation 46 comprised in computation 40 comprises, given a request for a value at an argument $x_o$ of one of the many possible AF functions, such as those shown in FIG. 3 or 5B (i.e., GELU(x), SWISH(x), L(x), M(x), N(x), P(x)), reading (44) one or more relevant values from a corresponding lookup table in memory and, if required, interpolating over the two or more read values to generate the required difference value at $x_o$, such as to provide $G(x_o)$=GELU($x_o$)−ReLU($x_o$). As noted above, using the even difference-function (in the form of a lookup table) makes the interpolation computationally highly efficient in hardware.

A ReLU computation 42 comprised in computation 40 comprises, given the request in parallel, calculating the value ReLU ($x_o$).

An addition computation 48 comprised in computation 40 comprises adding the two above values at $x_o$ and output the required value of the activation function at $x_o$ (i.e., one of GELU($x_o$), SWISH($x_o$), L($x_o$), M($x_o$), N($x_o$), P($x_o$)).

Block diagram 45 is brought by way of example, and is simplified for sake of clarity. For example, additional computations beyond those shown may be included in computation 40, and further to that, computation 40 may also include synchronization steps.

Figure 2:
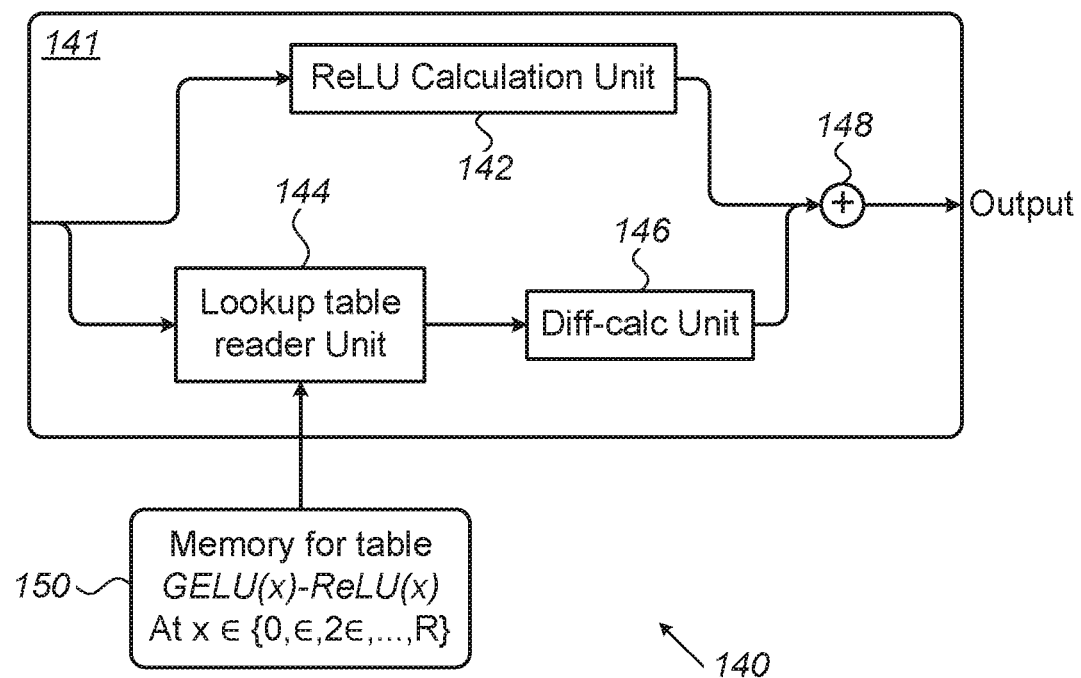
FIG. 2 is a block diagram schematically describing a computational apparatus configured to implement the approximation scheme of the activation function (AF) described in FIG. 1, in accordance with an embodiment of the present invention.

Implementation of Activation Function Approximation Scheme in Computation Hardware FIG. 2 is a block diagram schematically describing a computational apparatus 140 configured to implement the approximation scheme of activation function (AF) 18 described in FIG. 1, in accordance with an embodiment of the present invention. In some embodiments, computational apparatus 140 comprises circuitry 141 and a memory 150.

Computational apparatus 140 is shown by way of example as configured to output GELU AF values, but may be applied to approximate any other suitable AF, or multiple AFs, according to those required in ANN 100.

Memory 150 holds one or more precomputed lookup tables of respective difference-functions (e.g., of difference-functions S(x)=SWISH(x)−ReLU(x) and G(x)=GELU(x)−ReLU(x) plotted in FIG. 4). As described above, the shown lookup table in memory 150 covers an input range of arguments x, x∈[0, R], with a resolution E.

A Diff-calc unit 146 comprised in circuitry 141 is configured to, given a request for a value at an argument $x_o$ of one of the many possible AF functions, such as those shown in FIG. 3 or 5B (i.e., GELU(x), SWISH(x), L(x), M(x), N(x), P(x)), read relevant values from a corresponding lookup table in memory 150 and interpolate over the read values to generate the required difference value at $x_o$, such as to provide $G(x_o)$=GELU $(x_o)$−ReLU $(x_o)$. As noted above, using the even difference-function (in the form of a lookup table) makes the interpolation computationally highly efficient in hardware.

A ReLU calculation unit 142 comprised in circuitry 141 is configured to, given the request in parallel, calculate the value ReLU $(x_o)$.

An adder unit 148 comprised in circuitry 141 is configured to add the two above values at $x_o$ and output the required value of the activation function at $x_o$ (i.e., one of GELU $(x_o)$, SWISH $(x_o)$, L $(x_o)$, M $(x_o)$, N $(x_o)$, P $(x_o)$).

Circuitry 141 is brought by way of example, and is simplified for sake of clarity. For example, actual processing units may include more functionalities than those shown and further include synchronization logic. Memory 150 is brought by way of example, and is simplified for sake of clarity. For example, actual memory may hold multiple lookup tables, of multiple respective difference-functions that may be called by circuitry 141.

The configurations of the disclosed approximation architectures, which are described hereinabove, are example configurations that are shown purely for the sake of conceptual clarity. Any other suitable configurations can be used in alternative embodiments.

For example, in some embodiments, computational apparatus 140 is used as a shared resource that is not uniquely associated with any specific neuron circuit 10. In such embodiments, one or more instances of computational apparatus 140 are assigned as needed, to evaluate AF 18 for any desired neuron circuit 10 in ANN 100. In other embodiments, each neuron circuit 10 in ANN 100 comprises a respective instance of computational apparatus 140. Hybrid solutions, e.g., dedicated ReLU calculation unit 142 and Diff-calc unit 146 in each neuron 10, but shared lookup tables stored in a common memory, can also be used.

The different elements of ANN 100, including computational apparatus 140, may be implemented using suitable hardware, such as in one or more Application-Specific Integrated Circuits (ASICs) or Field-Programmable Gate Arrays (FPGAs), using software, using hardware, or using a combination of hardware and software elements. Memory 150 may be implemented using any suitable type of memory, e.g., RAM, ROM or Flash memory.

In some embodiments, some or all of the functions of ANN 100, e.g., some or all of the functions of computational apparatus 140, may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Activation Function Approximation in Deep Neural Networks Using Rectified-Linear-Unit Function FIG. 3 is a graph that shows the activation functions ReLU(x), GELU(x), and SWISH(x) over a given range, in accordance with an embodiment of the present invention. The functions are drawn over a range x∈[−4, 4], and are given by these equations:

$$ReLU(x) = \max(0, x)$$

$$GELU(x) = 0.5x\left(1 + \tanh\left(\sqrt{\frac{2}{\pi}}\left(x + 0.044715x^3\right)\right)\right)$$

$$SWISH(x) = \frac{x}{1+e^{-x}}$$

The GELU(x) and SWISH(x) functions are hard to approximate on computation hardware, a problem that may limit their adoption in practical applications, despite their advantages, such as yielding more consistent results during training than the ReLu(x) function, while retaining speed in inference similar to that of the ReLU(x) function.

FIG. 4 is a graph that shows difference-functions S(x)=SWISH(x)−ReLU(x) 32 and G(x)=GELU(x)−ReLU(x) 34, in accordance with an embodiment of the present invention. As seen, difference-functions S(x) 32 and G(x) 34 are bounded and even. In an embodiment, difference-functions S(x) and G(x) are provided as lookup tables with a prespecified resolution, as further described in FIG. 6, along with an example of a computational apparatus (e.g., processing circuitry) that performs the required interpolation over lookup table values.

Activation Function Generation and Approximation in Deep Neural Networks Using a Rectified-Linear-Unit Function As noted above, the disclosed technique enables not only the application of a computationally efficient approximation in hardware for existing activation functions, but also generation, e.g., based on variants of the ReLU(x) function, of a wide range of new activation functions and in the process approximate these with the same efficient approximation scheme.

In one embodiment, the disclosed computational apparatus is further configured to efficiently generate any of numerous asymmetric activation functions possible using an even or odd function that acts as difference-functions between the required activation function and a generalized ReLU function defined as:

GReLU(x;a)=max(0,ax)

where a is real, a>0.

As can be seen, the GELU and SWISH are special cases, received using ReLU by substituting required a in GReLU (x;a), and using even difference-functions G(x) or S(x) of FIG. 4. However, using difference-functions G(x) or S(x) with any other value of 6 also produces a readily approximated AF.

In another embodiment, the generalized ReLU function is further generalized to have a parametrized leaky term:

LeakyGReLU(x)=max(bx,ax)

Where b is real and satisfies 0≤b<a. Using the LeakyGReLU function with even or odd difference-functions, the disclosed technique can provide further variants of activation functions that are easy to approximate by a computational apparatus using the disclosed approximation scheme.

As noted above, any bounded and even or odd function can be used by the disclosed scheme to generate AF values of new AF functions that may be of use. FIGS. 5A and 5B are graphs that show, by way of example, bounded and even difference-functions (301, 303, 305, 307), and respective activation functions (L(x) 401, M(x) 403, N(x) 405, P(x) 407) generated by adding difference-functions (301, 303, 305, 307) to the ReLU function, in accordance with an embodiment of the present invention.

As seen, a wide range of activation function shapes can be generated using the disclosed method, all of which are implemented in hardware in the same efficient way as are the GELU and SWISH functions of FIGS. 3 and 4.

In particular, lookup tables provide values of the difference-functions (301, 303, 305, 307) with a prespecified resolution over a given range, that, along with the disclosed approximation scheme, are easy to use for interpolation in processing circuitry to generate any value of activation functions (L(x) 401, M(x) 403, N(x) 405, P(x) 407) for an argument inside the given range.

In particular, new asymmetric activation functions may be received from even activation functions such as LiSHT, that are used for that purpose as the difference-function.

In a similar manner, odd bounded functions can be provided, each of which as lookup tables of a difference-function from the ReLU or a generalized ReLU, and respective activation functions can be generated using the lookup tables and the ReLU or generalized ReLU, that will find uses, and are easy to approximate in hardware.

Figure 6:
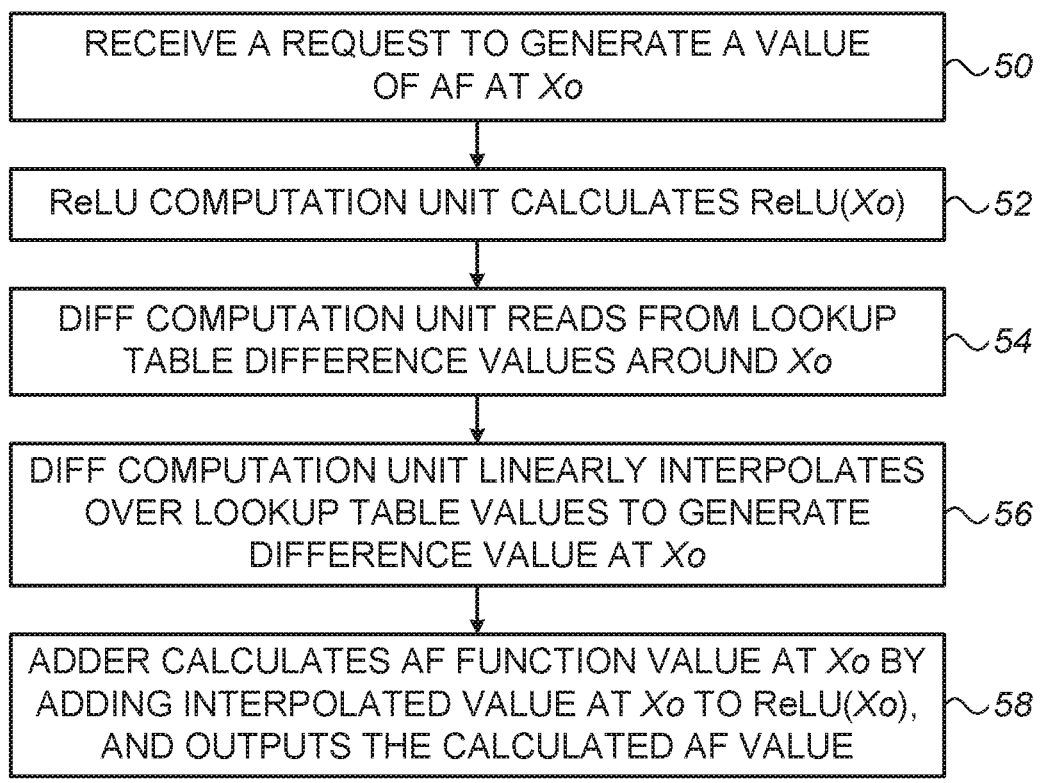
FIG. 6 is a flow chart that schematically illustrates a method to approximate the activation functions of FIG. 3 or 5B, in accordance with an embodiment of the present invention.

FIG. 6 is a flow chart that schematically illustrates a method for approximating the activation functions of FIG. 3 or 5B, in accordance with an embodiment of the present invention. The algorithm, according to the present embodiment, carries out a process that begins with computational apparatus 40 receiving, at a value requesting step 50, a request to generate a value of one of the activation functions at a certain argument $x_o$ within a predetermined range [−R, R]. In response to the request, ReLU calculation unit 142 generates ReLU($x_o$), at a ReLU calculation step 52. In parallel, Diff-calc unit 146 reads values around $x_o$ from a corresponding lookup table stored in memory 150, at a reading from memory step 54. Next, Diff-calc unit 146 interpolates over the read values to generate the required difference value at $x_o$, at an interpolation step 56. Finally, adder 148 adds the two values to derive the required AF value at $x_o$, and outputs the result, at an AF value calculation step 58.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computational apparatus for implementing a neural network model having multiple neurons that evaluate an activation function, the apparatus comprising:
   a memory, configured to hold values of a difference-function, each value being a respective difference between the activation function and a predefined baseline function; and
   circuitry, configured to evaluate the neural network model, including, for at least one of the neurons:
      evaluate the baseline function at the argument;
      retrieve from the memory one or more values of the difference-function responsively to the argument; and
      evaluate the activation function at the argument based on the baseline function at the argument and on the one or more values of the difference-function.

2. The computational apparatus according to claim 1, wherein the baseline function comprises a Rectified Linear Unit (ReLU) function defined as ReLU(x)=max(0,x).

3. The computational apparatus according to claim 1, wherein the baseline function comprises a generalized ReLU (GReLU) function defined as GReLU(x)=max(0,ax), where a>0.

4. The computational apparatus according to claim 3, wherein the baseline function comprises a Leaky GReLU (LeakyGReLU) function defined as LeakyGReLU(x)=max(bx, ax), where 0<b<a.

5. The computational apparatus according to claim 1, wherein the activation function comprises at least one function, selected from a group of functions consisting of a Gaussian Error Linear Unit (GELU) function, a SWISH function, a Linearly Scaled Hyperbolic Tangent (LISHT) function, and a Symmetrical Gelu (SGELU) function.

6. The computational apparatus according to claim 1, wherein the difference-function has one of an even symmetry and an odd symmetry.

7. The computational apparatus according to claim 1, wherein the circuitry is configured to:
   retrieve two or more values of the difference-function from the memory;
   evaluate the difference-function at the argument by interpolating the two or more values; and
   evaluate the activation function at the argument by summing the baseline function at the argument and the difference-function at the argument.

8. The computational apparatus according to claim 1, wherein the circuitry is further configured to output the evaluated activation function at the argument for use in the neural network model.

9. A computational method for implementing a neural network model having multiple neurons that evaluate an activation function, the method comprising:
   holding in a memory values of a difference-function, each value being a respective difference between the activation function and a predefined baseline function; and
   evaluating the neural network model, including, for at least one of the neurons:
      evaluating the baseline function at the argument;
      retrieving from the memory one or more values of the difference-function responsively to the argument; and
      evaluating the activation function at the argument based on the baseline function at the argument and on the one or more values of the difference-function.

10. The computational method according to claim 9, wherein the baseline function comprises a Rectified Linear Unit (ReLU) function defined as ReLU(x)=max(0,x).

11. The computational method according to claim 9, wherein the baseline function comprises a generalized ReLU (GReLU) function defined as GReLU(x)=max(0,ax), where a>0.

12. The computational method according to claim 11, wherein the baseline function comprises a Leaky GReLU (LeakyGReLU) function defined as LeakyGReLU(x)=max (bx, ax), where 0<b<a.

13. The computational method according to claim 9, wherein the activation function comprises at least one function, selected from a group of functions consisting of a Gaussian Error Linear Unit (GELU) function, a SWISH function, a Linearly Scaled Hyperbolic Tangent (LISHT) function, and a Symmetrical Gelu (SGELU) function.

14. The computational method according to claim 9, wherein the difference-function has one of an even symmetry and an odd symmetry.

15. The computational method according to claim 9, wherein evaluating the neural network model comprises:
   retrieving two or more values of the difference-function from the memory;
   evaluating the difference-function at the argument by interpolating the two or more values; and
   evaluating the activation function at the argument by summing the baseline function at the argument and the difference-function at the argument.

16. The computational method according to claim 9, and comprising outputting the evaluated activation function at the argument for use in the neural network model.

\* \* \* \* \*